July 23, 1940.  H. F. POOL ET AL  2,208,731
COTTON PICKER
Filed Feb. 28, 1939  2 Sheets-Sheet 1
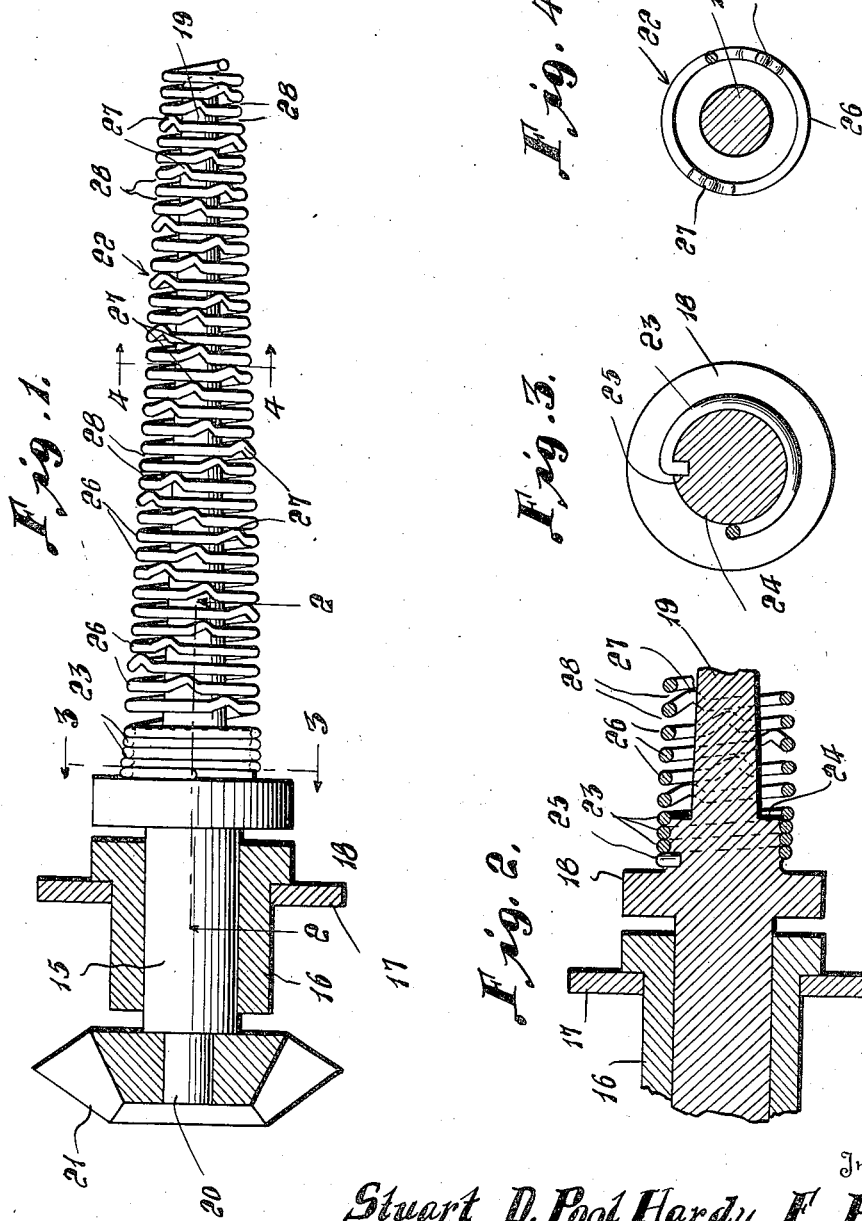
Inventors
Stuart D. Pool, Hardy. F. Pool
By Milton E Lowry
Attorney July 23, 1940.  H. F. POOL ET AL  2,208,731
COTTON PICKER
Filed Feb. 28, 1939  2 Sheets-Sheet 2
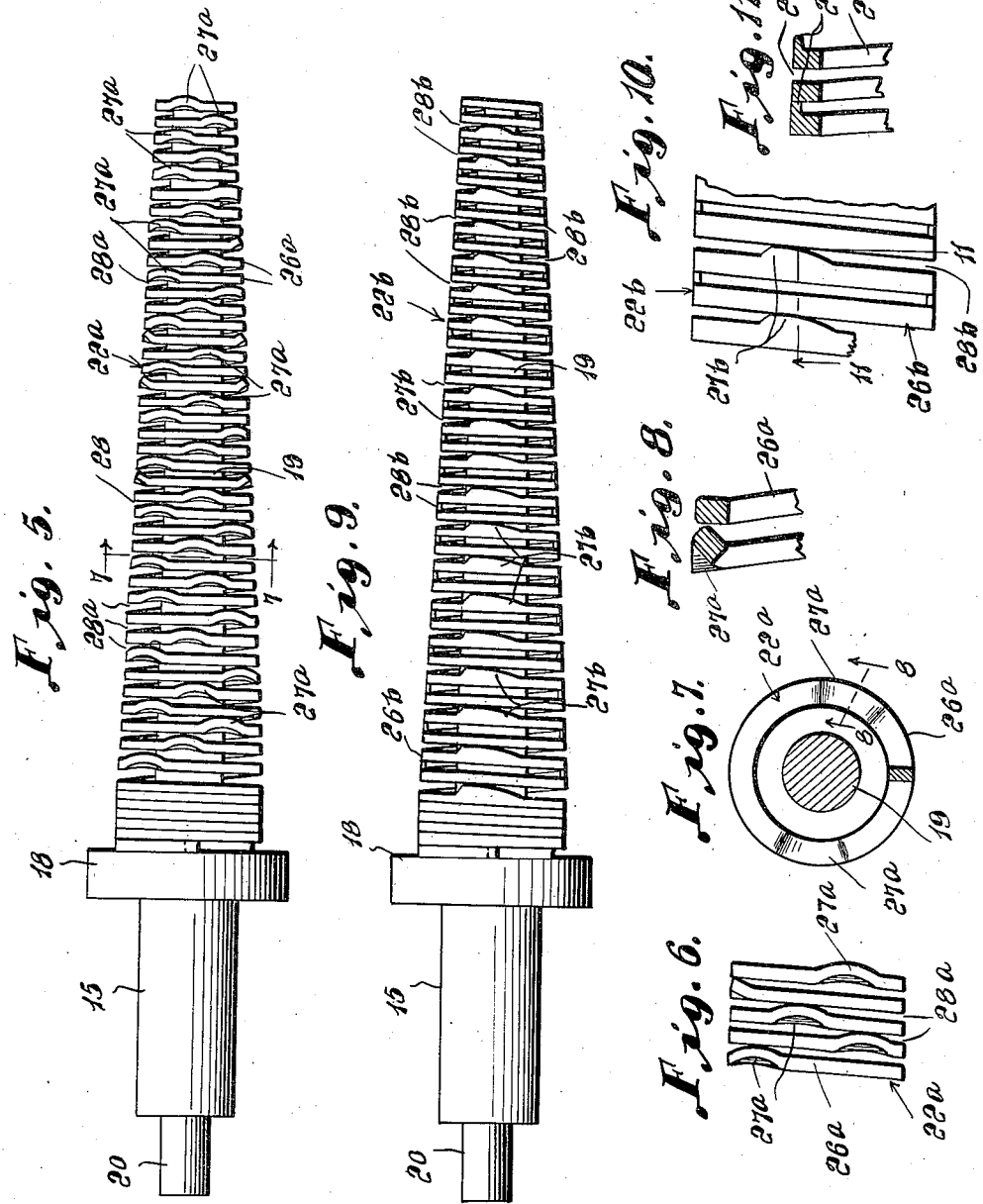
Inventors
Stuart D. Pool, Hardy F. Pool
By Milton E. Young
Attorney Patented July 23, 1940

2,208,731

UNITED STATES PATENT OFFICE 2,208,731

COTTON PICKER

Hardy F. Pool, Mason City, Iowa, and Stuart D. Pool, Moline, Ill.

Application February 28, 1939, Serial No. 258,908

16 Claims. (Cl. 56—50)

This invention relates to certain new and useful improvements in cotton pickers and comprises a new and novel form for that portion of the spindle or picking finger which extends into the plant and plucks the cotton.

In cotton picking machines the spindles or picking fingers are generally mounted on a drum, which rotates about a vertical axis as the machine advances so that the picker fingers enter and leave approximately the same place in the plant. These picker fingers also rotate about their own axes, generally at a high number of R. P. M., and they are set sufficiently close together and in sufficient numbers so that they penetrate most parts of the cotton plant which is held against them, either by shields, or by another and opposite picking drum. There are also in a machine of this sort, other parts such as mounting framework, motive power for the drum, for the spindles, and for moving the machine down the cotton row, means for transmitting and controlling this power, means for removing the cotton from the spindles, means for actuating the brushes, and means for disposing of the picked cotton, either into a wagon or other container.

In machines of this character the principal difficulty is in getting the cotton onto and off the picker-spindles or fingers without unnecessary injury to the plant, without the accumulation of too much trash, and without lowering the grade of the cotton as, say, by oil spotting.

The object of this invention is to provide cotton picking spindles or fingers which are more efficient at cotton picking, and from which the cotton may be more readily removed, as a move toward a more efficient cotton picker and one more mechanically possible.

This invention contemplates spindles or fingers mounted on the usual drum, the spindles to be mounted in bearings, and rotated about their own axes, by a gear, belt, friction, or chain drive, preferably mounted within the drum.

The invention refers particularly to that portion of the spindle or picker fingers which enters the plant. Fingers of this sort generally have a length several times that of their diameter and a small cross section. They may be tapered so that the point, or blunt point, enters the plant more easily, and they may be round or multiple-sided.

In the spindle disclosed in this application, the general shape will be the same as heretofore, but it is contemplated that this spindle shall have grooves, indentations or cuts on the surface as though the spindle was ringed with grooves or had a screw thread or helix surface, except that the lead angle may be multiple, and may or may not be constant, but may vary with the taper or otherwise. In addition this groove, indentation or cut is to be stopped off at intervals, by a not abrupt closing of the walls. The cut, however, to extend through or partly through the stopped off interval. The object is to provide a groove on the spindle into which the cotton strands from the boll may fall, and a constriction where they may be caught by the rotation of the spindle, the walls of said constriction to be held together by the resiliency of the material employed with sufficient force so that any cotton caught will be pulled or spun from the boll.

It is a further object of the invention that the force with which the constrictions of the grooves are held together shall be insufficient to hold the cotton, when the surface of the spindle is presented to a brush or other spindle cleaning member, and that the brush, or cleaning member, shall either pull the cotton from the constriction or force it through the constriction. It is also contemplated that the lead of the groove, or series of grooves, and the rotation of the spindle may be such that a brush held against the spindle would tend to unscrew the cotton from the spindle just as a bolt may be unscrewed from a nut by rotating the bolt while holding the nut stationary. It is also contemplated that this special cotton picking finger may be attached to the body of the spindle easily and from outside the picker drum, though this is not a necessary condition.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a side elevational view, partly in section of a spindle body and cotton picking finger constructed in accordance with the present invention showing offset portions of the convolutions of the coiled wire picking fingers resiliently engaged with and adjacent the coils and holding the coils in spaced relation;

Figure 2 is a longitudinal detail sectional view taken on line 2—2 of Figure 1, showing the manner of anchoring the coiled wire picking finger to the spindle body;

Figure 3 is a cross-sectional view taken on line 3—3 of Figure 1;

Figure 4 is a cross-sectional view taken on line 4—4 of Figure 1;

Figure 5 is a side elevational view of a spindle body as shown in Figure 1, with a modified form of cotton picking finger;

Figure 6 is a fragmentary side elevational view of the cotton picking finger shown in Figure 5;

Figure 7 is a cross-sectional view taken on line 7—7 of Figure 5;

Figure 8 is a detail sectional view taken on line 8—8 of Figure 7;

Figure 9 is a side elevational view of a spindle body similar to the one illustrated in Figures 1 and 5 with another form of cotton picking finger;

Figure 10 is a fragmentary side elevational view of the cotton picking finger shown in Figure 9; and Figure 11 is a detail sectional view taken on line 11—11 of Figure 10.

As the invention disclosed herein primarily relates to the construction of the cotton picking finger that is rotatable upon its own axis, no reference will be made herein to the type of machine with which the same is to be employed, but it is to be understood that said picking finger may have appropriate operating devices therefor, such as a gear, belt, friction or chain drive within a drum with which the cotton picking finger is associated and for purposes of illustration as shown in Figure 1, a gear drive is provided for effecting rotation of the cotton picking finger. As shown in Figures 1 to 4, the cotton picking finger is associated with a spindle body that comprises a bearing shaft 15 journalled in a bearing 16 that is mounted in the drum 17, one end of the bearing shaft 15 carrying a disk head 18 laterally of the bearing 16 and an elongated tapering spindle outwardly of the disk head 18 in line with the bearing shaft 15. The other end of the bearing shaft 15 outwardly of the bearing 16 is reduced as at 20 and has a driven gear 21 anchored thereon and which in turn is connected with power means, it being understood, as stated, that other operating means may be provided for the spindle shaft 15.

The cotton picking finger per se, designated in general by the reference character 22, comprises a coiled wire of tapering formation enclosing the tapering spindle 19, a group 23 of the convolutions at the larger end of the finger being in contacting relation and seated upon the enlarged shoulder 24 at the base of the tapering spindle 19 with the terminal end of the larger convolution 23 anchored as at 25 in the enlarged shoulder 24, as clearly shown in Figures 2 and 3.

As stated, the cotton picking finger 22 is formed of resilient coiled wire and the resilient characteristic of the coiled wire tends to move the coils thereof into contact with each other. However, as shown in Figures 1 and 2, the coils 26 between the contacting group 23 and the smaller tapered end of the finger are held in spaced relation by a series of offsets 27 in each coil of the finger that are in a plane perpendicular to the plane of the coil to provide grooves 28 between adjacent coils 26. The lateral offsets 27 in adjacent coils 26 are located at different points in said adjacent coils so that no two offsets in adjacent coils are in the same plane longitudinally of the finger 22 as will be readily understood from an inspection of Figure 1. The offsets 27 of one coil engage a plain portion of an adjacent coil and provide constrictions in the grooves 28 between adjacent coils 26 and such constrictions are of substantially V-shape. The cotton picking finger 22 is illustrated as formed of round wire, but it is to be understood that the cross-sectional configuration thereof may be of any form desired with the V-shaped constrictions disposed at the periphery of the finger.

In the form of the invention illustrated in Figures 5 to 8, the cotton picking finger 22a is in the form of a tapering coil spring formed of flat wire wound edgewise with a series of offsets 27a in each coil that are formed by twisting a portion of the coil to present such offset portion at the outer circumference of the coil out of line with the remaining portion thereof for contact with a plain portion of an adjacent coil, the inner portion of the offsets 27a remaining substantially in line with the body of the coil. The offsets 27a are in staggered relation, no two offsets in adjacent coils being opposite each other, the offset portions 27a providing grooves 28a between the convolutions 26a with constrictions of substantially V-shape at the points of contact of the offsets 27a with plain portions of adjacent coils 26a.

In the form of invention illustrated in Figures 9 to 11, the coiled resilient wire finger 26b may be formed of wire of any desired cross-sectional configuration, flat wire being illustrated as wound edgewise to form the coils 26b and each coil 26b has a part of the peripheral wall thereof at spaced points swaged or forged to provide offsets 27b at the periphery of the coil 26b that engage the plain portions of an adjacent coil 26b, no two offsets in adjacent coils being in line with each other, the offsets 22b provide grooves 28b between the coils 26b and constrictions of substantially V-shape between adjacent coils.

The spiral winding of the wire to form the cotton picking finger and the offsets carried by the coils or convolutions of the finger provide spaces or grooves between the coils in simulation of a spiral thread. A cotton picking machine equipped with the fingers disclosed in this application is moved through the cotton fields, the fingers being engaged with the cotton bolls and the cotton of the boll that moves into the grooves between the coils is gripped by the offsets of the coils to be removed from the bolls. A brush, scraper or the like is then engaged with a cotton filled picking finger and when held stationary or moved in contact therewith, the resultant action is similar to the unscrewing of a nut from a bolt, the cotton caught by the convolutions of the picking finger being moved through the spiral grooves towards the smaller tapered end of the finger and disengaged therefrom.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

What is claimed is:

1. In a device of the character described, a cotton picking finger comprising a body of tapering formation, said body having a spiral groove and constrictions in said groove substantially normally closing the passage therethrough and lying entirely within the outer surface of the body with the picked cotton held in the groove between the walls thereof.

2. In a device of the character described, a cotton picking finger comprising a body of tapering formation, said body having a spiral groove and constrictions in said groove substantially normally closing the passage therethrough and lying entirely within the outer surface of the body with the picked cotton held in the groove between the walls thereof, said constrictions being carried by the wall of the groove facing the tapered end of the finger.

3. In a device of the character described, a cotton picking finger comprising a body of tapering formation, said body having a spiral groove and constrictions in said groove substantially normally closing the passage therethrough and lying entirely within the outer surface of the body with the picked cotton held in the groove between the walls thereof, and said constrictions presenting substantially V-shaped areas at opposite sides thereof in said spiral groove.

4. In a device of the character described, a cotton picking finger comprising a body of tapering formation, said body having a spiral groove and constrictions in said groove substantially normally closing the passage therethrough and lying entirely within the outer surface of the body with the picked cotton held in the groove between the walls thereof, said constrictions being carried by the wall of the groove facing the tapered end of the finger, and said constrictions presenting substantially V-shaped areas at opposite sides thereof in said spiral groove.

5. A device as set forth in claim 1, characterized by said constrictions being in the form of offsets extending across the groove and forming a part of the outer surface of the finger body.

6. A device as set forth in claim 2, characterized by said constrictions being in the form of offsets extending across the groove and forming a part of the outer surface of the finger body.

7. A device as set forth in claim 3, characterized by said constrictions being in the form of offsets extending across the groove and forming a part of the outer surface of the finger body.

8. A device as set forth in claim 4, characterized by said constrictions being in the form of offsets extending across the groove and forming a part of the outer surface of the finger body.

9. A device as set forth in claim 1, characterized by the body being formed of resilient coiled wire, and said constrictions comprising offset portions in each convolution of the wire directed towards the tapered end of the finger and engaged with a plain portion of an adjacent convolution to space the convolutions and form said spiral groove.

10. A device as set forth in claim 1, characterized by the body being formed of resilient coiled wire, and said constrictions comprising offset portions in each convolution of the wire directed towards the tapered end of the finger and engaged with a plain portion of an adjacent convolution to space the convolutions and form said spiral groove, and said offsets being of substantially V-shape to form substantially V-shaped pockets at opposite sides thereof in said groove.

11. A device as set forth in claim 1, characterized by the body being formed of resilient coiled wire, and said constrictions comprising offset portions in each convolution of the wire directed towards the tapered end of the finger and engaged with a plain portion of an adjacent convolution to space the convolutions and form said spiral groove, and said offsets being of substantially V-shape to form substantially V-shaped pockets at opposite sides thereof in said groove, the finger wire being substantially circular in cross-section with the offset disposed laterally of the plane of the convolution.

12. A device as set forth in claim 1, characterized by the body being formed of resilient coiled wire of substantially rectangular formation in cross-section and wound edgewise, and said constrictions comprising offset portions in each convolution of the wire directed towards the tapered end of the finger for engagement with a plain portion of an adjacent convolution, the offsets at their outer ends being disposed in said groove a greater distance than the inner end thereof.

13. A device as set forth in claim 1, characterized by the body being formed of resilient coiled wire of substantially rectangular formation in cross-section and wound edgewise, and said constrictions comprising offset portions in each convolution of the wire directed towards the tapered end of the finger for engagement with a plain portion of an adjacent convolution, the offsets at their outer ends being disposed in said groove a greater distance than the inner end thereof, said offsets being of substantially arcuate formation and defining substantially V-shaped pockets at each side thereof.

14. A device as set forth in claim 1, characterized by the body being formed of resilient coiled wire, and said constrictions comprising offset portions in each convolution of the wire directed towards the tapered end of the finger for engagement with a plain portion of an adjacent convolution, the offsets at their outer ends being disposed in said groove a greater distance than the inner end thereof.

15. A device as set forth in claim 1, characterized by the body being formed of resilient coiled wire of substantially rectangular formation in cross-section and wound edgewise, and said constrictions comprising offset portions at the outer edge of each convolution of the wire directed towards the tapered end of the finger and engaged with a plain portion of the adjacent convolution to form said groove.

16. A device as set forth in claim 1, characterized by the body being formed of resilient coiled wire, and said constrictions comprising offset portions at the outer edge of each convolution of the wire directed towards the tapered end of the finger and engaged with a plain portion of the adjacent convolution to form said groove.

HARDY F. POOL.
STUART D. POOL.